F. CONTA.
BICYCLE LOCK.
APPLICATION FILED SEPT. 22, 1909.
947,073.
Patented Jan. 18, 1910.
2 SHEETS—SHEET 1.
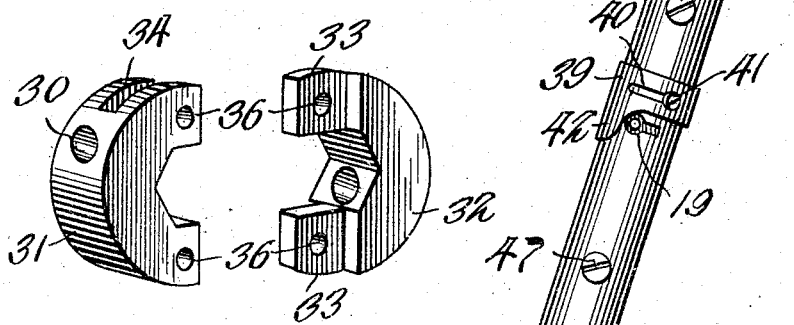
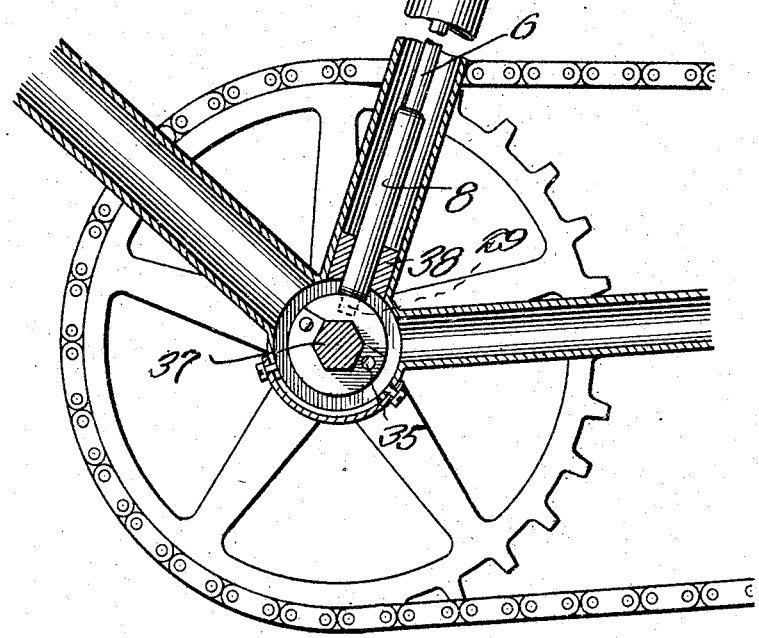
Witnesses
Hugh H. Ott.
R. M. Smith.
Inventor
Frank Conta
By Victor J. Evans
Attorney

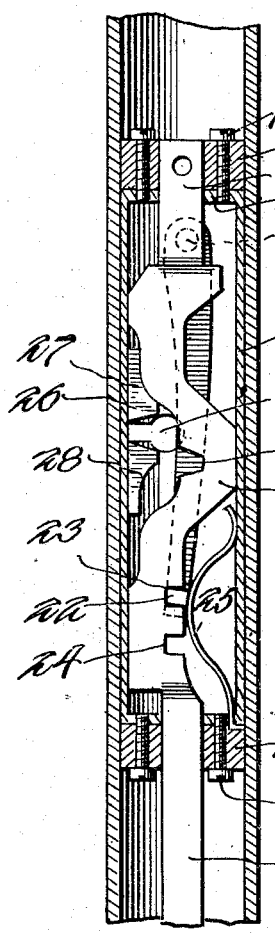
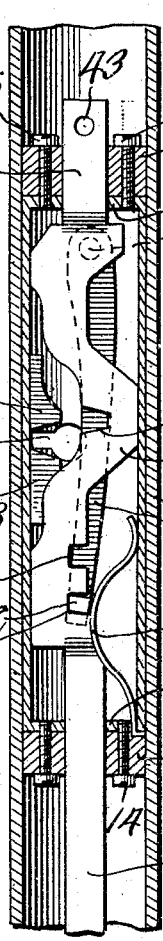
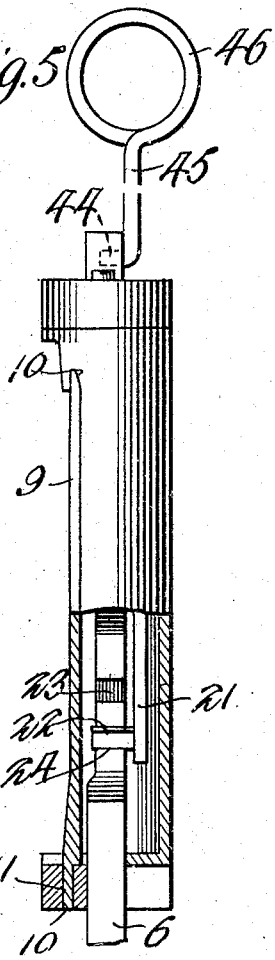
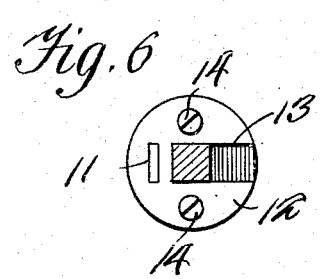

UNITED STATES PATENT OFFICE.

FRANK CONTA, OF DACONO, COLORADO.

BICYCLE-LOCK.

947,073. Specification of Letters Patent. Patented Jan. 18, 1910.

Application filed September 22, 1909. Serial No. 518,923.

*To all whom it may concern:*

Be it known that I, FRANK CONTA, a citizen of the United States, residing at Dacono, in the county of Weld and State of Colorado, have invented new and useful Improvements in Bicycle-Locks, of which the following is a specification.

This invention relates to bicycle locks, the object of the invention being to provide a simple and effective lock for enabling the owner of a bicycle to lock the crank shaft to prevent unauthorized persons from moving or riding the machine, the lock being so constructed and arranged as to adapt it to be readily inserted and removed from one of the tubular frame bars of the machine so that it may be readily repaired.

A further object of the invention is to provide a lock of peculiar organization which is especially designed for the purpose stated and which will successfully resist picking up by ordinary agencies.

With the above and other objects in view, the nature of which will more fully appear as the description proceeds, the invention consists in the novel construction, combination and arrangement of parts as herein fully described, illustrated and claimed.

In the accompanying drawings:—Figure 1 is a side elevation, partly in section, of a sufficient portion of a frame of a bicycle to illustrate the application of the lock mechanism thereto. Fig. 2 is a detail perspective view of the sectional keeper collar showing the sections disconnected. Fig. 3 is a vertical longitudinal section through the frame bar and lock case, showing the lock mechanism. Fig. 4 is a similar view, showing a different position of the parts of the lock. Fig. 5 is an elevation, partly in section, of the lock case detached, showing the means for inserting and removing the same in the frame bar of the bicycle. Fig. 6 is a bottom plan view of the lock case, showing the stem or plunger of the bolt in cross section.

The bicycle lock comprises essentially a lock case 1 in the form of a tube, the external diameter of which is just sufficient to enable the same to fit snugly within the tubular frame bar 2 of a bicycle, said frame bar being shown as consisting of the post tube. This lock case 1 which is cylindrical is provided with an upper head 3 and a lower head 4 and these two heads are apertured, the upper head receiving a squared shank 5 at the upper end of the bolt while the lower head receives the squared rod or stem 6 of the bolt, the latter being designated at 8 in Fig. 1. The lock case is cut away at one side, as illustrated in Fig. 5 and is closed on that side by means of a face plate 9 the upper end of which is seated in notches 10, in the main body of the lock case while the lower end of the plate 9 is provided with a tongue 10' which is received in a slot 11 in a combined guide and face plate holder 12 of disk form as shown in Fig. 6, said holder 12 being provided with a slot 13 opening out at one side thereof to receive the stem or rod 6 and enable said holder to be introduced laterally over the stem or rod 6 in a manner clearly illustrated in Fig. 6. The holder 12 is held in place by one or more screws 14 which connect the same to the lower head 4 of the lock case. It will be understood that the holder 12 is first slipped over the stem or rod 6 and then slid upward until the tongue 10 enters the slot 11 after which the screws 14 are inserted.

At the upper end of the lock case a similar guide 15 is secured to the upper head 3 by means of screws 16 or their equivalent. Between the upper shank 5 and the lower rod or stem 6, there is arranged a bolt shifter 17 having a key notch 18 therein movable across the key hole 19 by means of the key being receivable in the notch 18 of the member 17 for the purpose of shifting said member so as to produce a longitudinal sliding movement of the bolt. Pivotally connected to the bolt at the point 20 is a tumbler 21 provided with a lug 22 movable into and out of either one of a pair of notches 23 and 24 in the member 17 for the purpose of locking the said member in either of its two extreme positions and thereby holding the bolt in a locked or unlocked position.

25 designates a spring secured to the inside of the lock case and bearing against the tumbler immediately adjacent to and behind the tumbler lug 22, as clearly shown in Figs. 3 and 4.

26 designates a ward rendering it necessary to form a notch in the key bit to enable said key to be manipulated to operate the lock. In addition to this function, as a ward, the member 26 is shouldered as shown at 27 and 28 to form a double stop for the member 18 thereby limiting the opposite movements of the member and consequently the bolt connected to and movable with and by means of said member.

By reference to Fig. 1 it will be noted that the bolt 8 is provided at its lower extremity with a reduced tenon 29 which is adapted to enter one of a series of sockets or holes 30 in a sectional or two-part keeper collar, the sections of which are indicated at 31 and 32, as shown in detail in Fig. 2, wherein it will be observed that one of the collar sections is provided with tongues 33 which are received in slots or notches 34 in the other member, the two members being secured together by passing screws, pins or other suitable fasteners 35 through registry holes 36 in the parts referred to. The bore of the hollow agrees with the cross sectional shape of the crank shaft 37 of the machine, as shown in Fig. 1, so that when the collar is held stationary, it is impossible to revolve the crank shaft 37 and in this way the mechanism of the bicycle is locked. 38 designates an auxiliary guide or bushing through which the lock 8 plays, said bushing being fastened on the lower end of the tubular frame bar 2, as shown in Fig. 1.

39 designates a key hole guard in the form of a sleeve adapted to be rotated partially around the frame bar 2 and being for that purpose provided with a slot 40 through which passes a headed stud 41 on the frame bar 2. The key hole guard 39 is provided with an extension lip 42 which is adapted to cover and inclose the key hole 19 when turned in the proper direction, as will be readily understood by the disclosure in Fig. 1. This guard prevents dust, dirt and other foreign matter from obtaining entrance to the lock mechanism.

In order to provide for the insertion and removal of the lock, as a whole, the shank 5 is provided adjacent to its upper extremity with a hole 43 adapted to receive the laterally projecting extremity or hook 44 of an extractor illustrated in Fig. 5, wherein it is seen to consist of a rod 45 of suitable length provided at its upper end with an eye or handle 46. After removing the saddle or seat from the machine, the extractor 45 may be inserted downward into the upper end of said tube or frame bar 2, until the hook 44 is inserted in the hole 43 of the shank 5. Then by loosening the lock screws 47 which pass through the bar and fasten the lock case in place, the lock case may be withdrawn in order to facilitate repair and alteration of the lock mechanism. The lock is reinserted in the tube of the frame bar in the same manner by means of the extractor 45.

I claim:—

1. The combination with a tubular frame bar of a bicycle, of a lock embodying a cylindrical lock case adapted to slide within said bar, a bolt having a projecting shank adapted to extend above the top of the lock, and a lock case extractor having means to engage the projecting shank of the bolt, substantially as and for the purpose described.

2. A bicycle lock comprising a cylindrical lock case adapted to be slid into and out of one of the tubular frame bars of the bicycle, a key operated bolt slidingly mounted in said lock case and adapted to engage a keeper on the crank axle and also provided with a shank extending through the top of the lock case and formed with a hole therein, and a lock case extractor consisting of a rod having a hook at one end to engage the hole in the shank referred to and provided at its opposite end with a handle portion, substantially as described.

3. In a bicycle lock, the combination of a cylindrical lock case insertible in one of the tubular frame bars of the machine, said lock case being open at one side, a base plate for closing the open side of the lock case, one end of said plate being receivable in notches in the main body of the lock case, and a combined bolt guide and face plate holder detachably connected to the lower extremity of the lock case and provided with a slot to receive the stem of the bolt and also provided with a slot to receive a tongue at the lower end of the detachable face plate of the lock, substantially as described.

In testimony whereof I affix my signature in presence of two witnesses.

FRANK CONTA.

Witnesses:
F. L. SWANBERGER,
W. S. HINKLER.